(12) United States Patent
Bouchard

(10) Patent No.: US 6,179,535 B1
(45) Date of Patent: Jan. 30, 2001

(54) LOCK CHAMBER

(76) Inventor: Gratien Bouchard, 4966 Jean-Brillant, Montréal (CA), H3W 1T7

( * ) Notice: Under 35 U.S.C. 154(b), the term of this patent shall be extended for 0 days.

(21) Appl. No.: 09/026,760

(22) Filed: Feb. 20, 1998

(51) Int. Cl.[7] .................................................. B62D 33/04
(52) U.S. Cl. ........................ 410/131; 296/24.1; 410/135
(58) Field of Search .......................... 296/24.1; 410/130, 410/131, 132, 135; 414/390

(56) References Cited

U.S. PATENT DOCUMENTS

| | | |
|---|---|---|
| 2,052,723 | 9/1936 | Richards . |
| 2,459,022 * | 1/1949 | Gentry ................................ 410/131 |
| 2,516,527 * | 7/1950 | Oltz ................................. 410/135 X |
| 2,633,714 * | 4/1953 | Wehby ................................ 296/24.1 |
| 2,827,958 | 3/1958 | Lee . |
| 3,029,747 * | 4/1962 | Shaver ............................... 410/132 X |
| 3,055,061 | 9/1962 | Dadras . |
| 3,082,899 * | 3/1963 | Squier et al. ......................... 296/24.1 |
| 3,107,400 | 10/1963 | Anderson . |
| 3,217,664 * | 11/1965 | Aquino et al. ......................... 410/131 |
| 3,834,562 | 9/1974 | Norrie . |
| 4,049,311 | 9/1977 | Dietrich et al. . |
| 4,505,126 * | 3/1985 | Jones et al. ...................... 296/24.1 X |
| 4,639,031 * | 1/1987 | Truckenbrodt ...................... 296/24.1 |
| 5,054,295 * | 10/1991 | Goulooze ......................... 296/24.1 X |
| 5,238,283 * | 8/1993 | Teigen ................................. 296/24.1 |
| 5,472,300 | 12/1995 | Lipschitz . |
| 5,704,676 * | 1/1998 | Hill ..................................... 296/24.1 |
| 5,755,478 * | 5/1998 | Kamiya et al. ...................... 296/24.1 |

FOREIGN PATENT DOCUMENTS

| | | |
|---|---|---|
| 33 27 182 | 2/1984 | (DE) . |
| 0 551 661 | 7/1993 | (EP) . |
| 2 718 120 | 10/1995 | (FR) . |

* cited by examiner

Primary Examiner—Janice L. Krizek
(74) Attorney, Agent, or Firm—Holland & Knight LLP

(57) ABSTRACT

This lock chamber defines an elongated storage compartment with a pair of openings at the opposite ends of the same. One opening is for receiving merchandise to be stored in the compartment, while the other opening is for retrieving the merchandise from the compartment. Several partitions extend across the compartment and are longitudinally adjustable within the same. The doors and the partitions can be locked. Preferably, the compartment is formed by a semi-trailer which is located with the merchandise retrieving opening in communication with the opening of a loading deck of a grocery store or the like. The lock chamber can receive several successive loads of merchandise of different volumes and delivered by trucks at hours of the day when the personnel operating the loading dock is not available.

18 Claims, 8 Drawing Sheets

LOCK CHAMBER

FIELD OF THE INVENTION

The present invention relates to a lock chamber, more particularly to such chamber forming a compartment for receiving merchandise at one end and for delivering the loaded merchandise at the other end.

BACKGROUND OF THE INVENTION

It frequently happens that delivery trucks are retarded in their delivery schedule and arrive at the merchandise receiving dock of a supermarket, a drug store, or any other retail store or the like, out of normal business hours with no personnel available for receiving the merchandise. This can be very expensive to the delivery company, so much so that the delivery trucks often come from a long distance.

OBJECTS OF THE PRESENT INVENTION

It is therefore the general object of the present invention to provide a lock chamber which will obviate the above mentioned disadvantages.

A more specific object of the present invention is to provide a lock chamber capable of receiving frozen, and temporarily storing fresh and dry merchandise, twenty four hours a day, seven days a week, without the intervention of the merchandise receiving personnel and which can take place with complete safety.

Another object of the present invention is to provide a lock chamber of the character described which can be either in the form of a merchandise receiving, theft proof room inside the receiving building, or in the form of a semi-trailer to be parked at the merchandise receiving dock of the receiving supermarket or the like organisation.

Another object of the present invention is to provide a locking chamber of the character described provided with adjustable partitions, each provided with locks, for successively receiving merchandises of variable volumes delivered by successive delivery trucks.

Another object of the present invention is to provide a lock chamber of the character described provided with means to make it theft-proof and which can be remote controlled by authorised personnel of the shipping company.

Another object of the present invention is to provide a lock chamber of the character described which can be selectively refrigerated under the control of the authorised personnel of a delivery company.

SUMMARY OF THE INVENTION

The lock chamber of the present invention comprises a storage structure for receiving merchandise having wall means defining a storage compartment therein, said wall means including top and bottom walls, a pair of opposed side walls and a pair opposite first and second end walls, said first end wall defining a merchandise receiving opening and said second end wall defining a merchandise retrieving opening, and a lockable door for each opening, whereby said compartment can be loaded through said merchandise receiving opening and unloaded through said merchandise retrieving opening and each door locked when said compartment contains merchandise.

Preferably, said compartment is elongated and has a uniform cross-sectioned area between said end walls and has openable and closable partitions within said compartment which, when closed, are parallel to said end walls, to form sub-compartments including a first sub-compartment defined by a first partition and the end wall with said merchandise retrieving opening, and partition position adjusting means to adjust the individual position of said partitions relative to one another and relative to said end walls to vary the volume of said subcompartments, whereby said first subcompartment can be loaded with merchandise when all of said partitions are opened and further including blocking devices to block each partition in adjusted position and locks carried by said partitions and operable to unlock said partitions only from their side facing said merchandise retrieving opening whereby said sub-compartments can be successively loaded through said merchandise receiving opening starting from said first sub-compartment with all of said partitions in opened position and the next sub-compartment can be loaded after closing and locking of the partition defining said first sub-compartment and all of said sub-compartments can be unloaded through said merchandise retrieving unlocked and by opening the door of said merchandise retrieving opening and by successively unlocked and opening said partitions.

Preferably, the storage structure is a wheeled trailer including retractable, stabilising, height adjustable struts and hitching means at one end wall for hitching said trailer to a road tractor.

Preferably, the lock chamber further includes an additional merchandise receiving opening made in at least one of said side walls adjacent said one end wall, an additional door for said additional merchandise receiving opening and locking means for said additional door.

Preferably, each door is an overhead door and further including a door operating electric motor for each door.

Preferably, each of said partitions include a pair of panels each having a laterally outer portion and a laterally inner portion, and said partition position adjusting means include a pair of top and bottom parallel tracks extending along and close to each side wall and normal to said end walls, top and bottom sleeve members longitudinally displaceable on and guided by said tracks, and said laterally outer portions of each panel pivoted to said top and bottom sleeve members for movement between an opened position extending along a related side wall and a closed position extending across said compartment and in which said laterally inner portion of said pair of panels meet together, said locks carried by said laterally inner portions of said pair of panels and said blocking means carried by said laterally outer portions of said pair of panels.

Preferably, said third locking means include stop lugs carried by said panel and coming in blocking contact with said side walls in the closed position of said panels.

Preferably, second locking means include a lever pivoted to the laterally inner portion of one panel, a lever retainer fixed to the laterally inner portion of the other panel, both said lever and said lever retainer located at the face of said panels looking towards said merchandise retrieving opening, a spring-loaded plunger carried by said lever retainer and biased towards entrance into a registering hole of said lever to lock said lever within said lever retainer and a lever operating arm secured to said lever and located at the opposite face of said panels to pivot said lever towards its locked position.

Preferably, the lock chamber further includes track supports fixed to said side walls and to said tracks at short intervals, said sleeve members being longitudinally split to clear said supports.

Preferably, the first locking means further includes an electronic circuit system normally stopping operation of the motor operating the door for said merchandise receiving opening and causing said operation when activated by recognition of a personal identification code number.

Preferably, said lock chamber is provided with refrigerating means for refrigerating said compartment, said electronic circuit system also serving to operate said refrigerating means when activated by recognition of a personal identification code number.

BRIEF DESCRIPTION OF THE ANNEXED DRAWINGS

In the annexed drawings.

DETAILED DESCRIPTION OF THE PREFERRED EMBODIMENT

Figure 1:
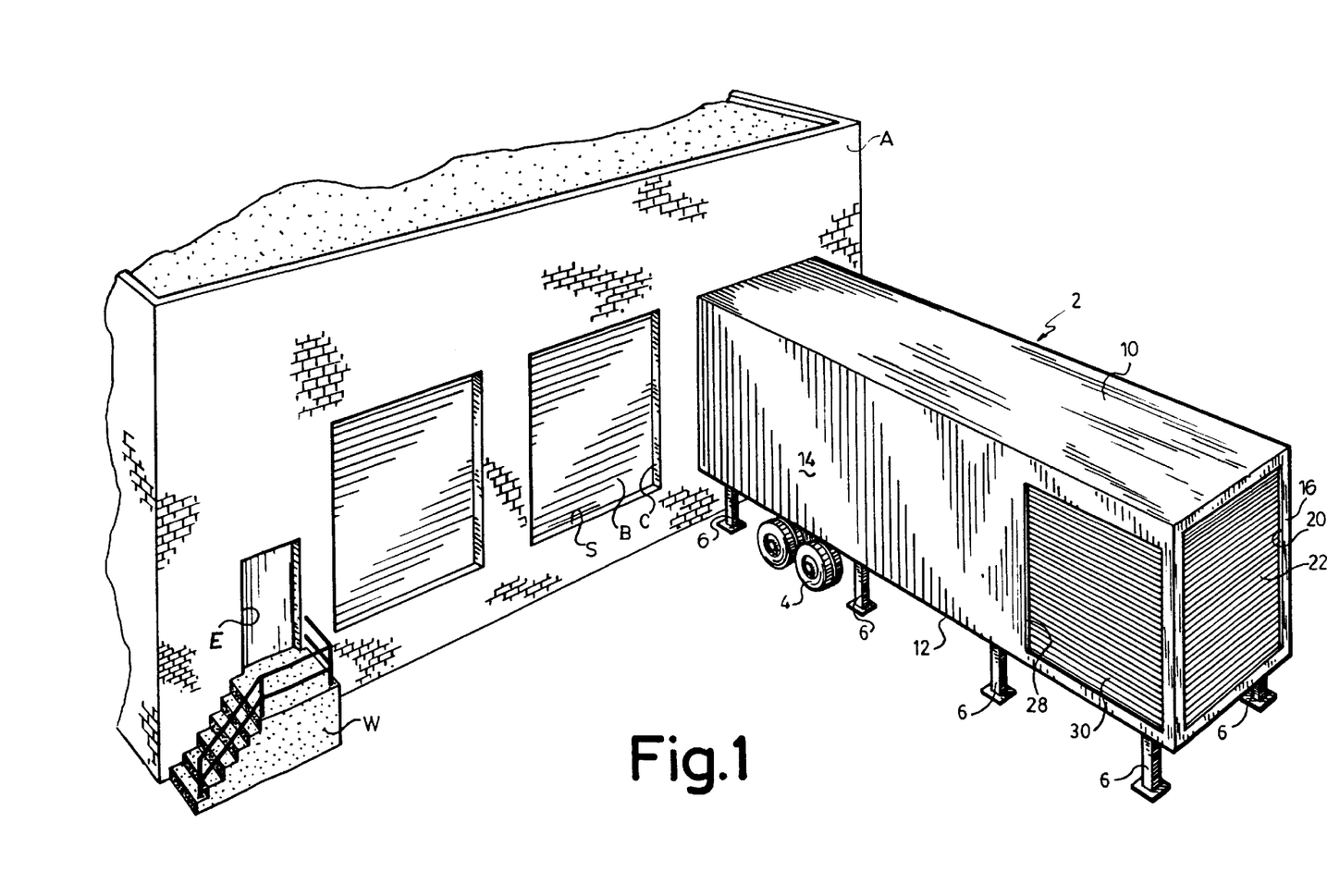
FIG. 1 is a perspective view showing the lock chamber of the invention in the form of a semi-trailer parked at the merchandise receiving dock of an establishment.
Figure 2:
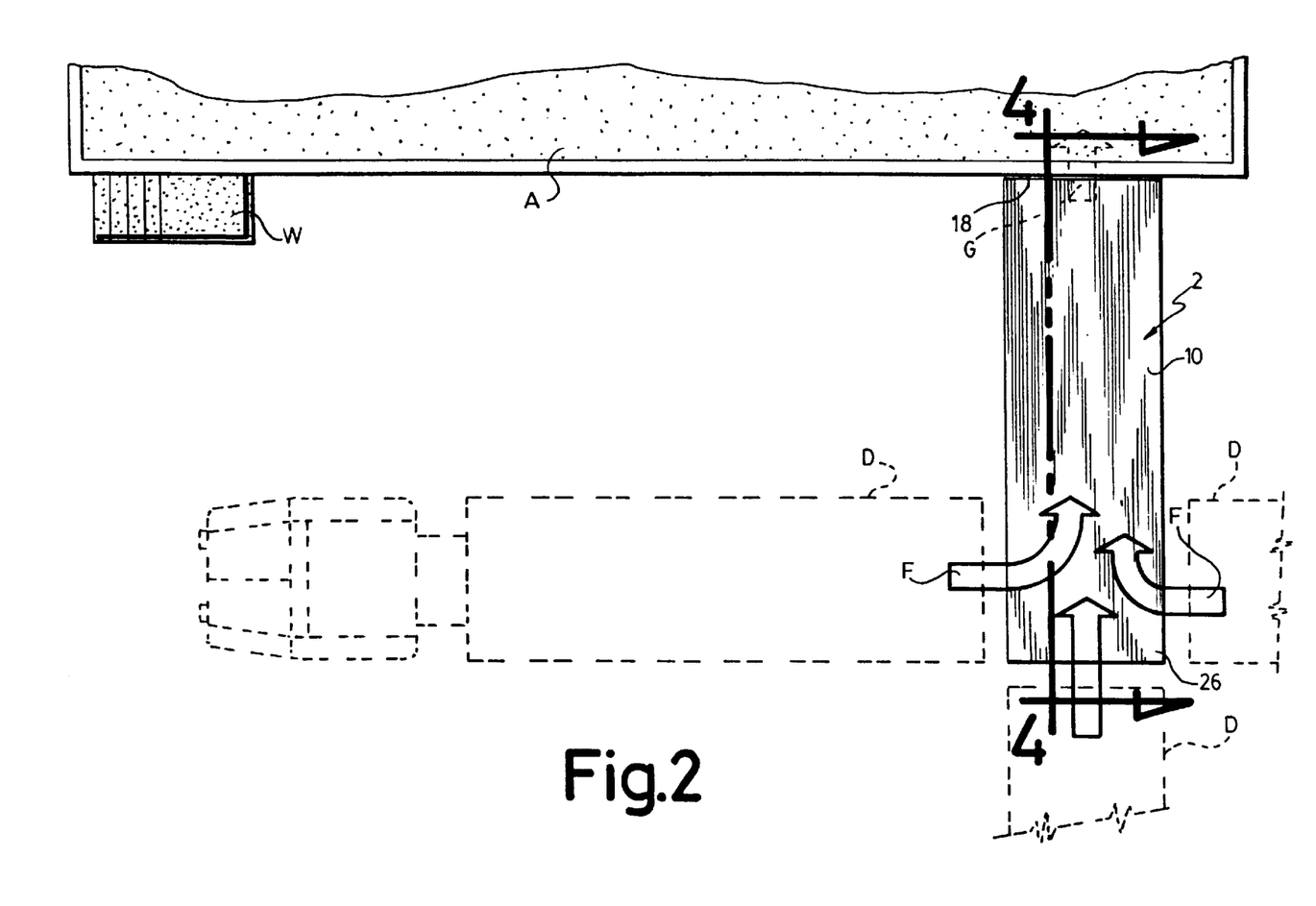
FIG. 2 is a top-plan view of the arrangement of FIG. 1 and showing additional possible positions of the semi-trailer.

Referring to FIGS. 1 and 2, there is shown merchandise receiving section or loading dock A of a supermarket, pharmacy, general merchandise store, hardware store or any other type of merchandise receiving organisation. This loading dock is normally provided with several doors B closing door openings C and the latter having a door sill S. A personnel entrance E with a stairway W is normally also provided.

The lock chamber of the present invention is shown at 2, it is in the form of a semi-trailer provided with rear wheels 4 and stabilising struts 6.

Figure 3:
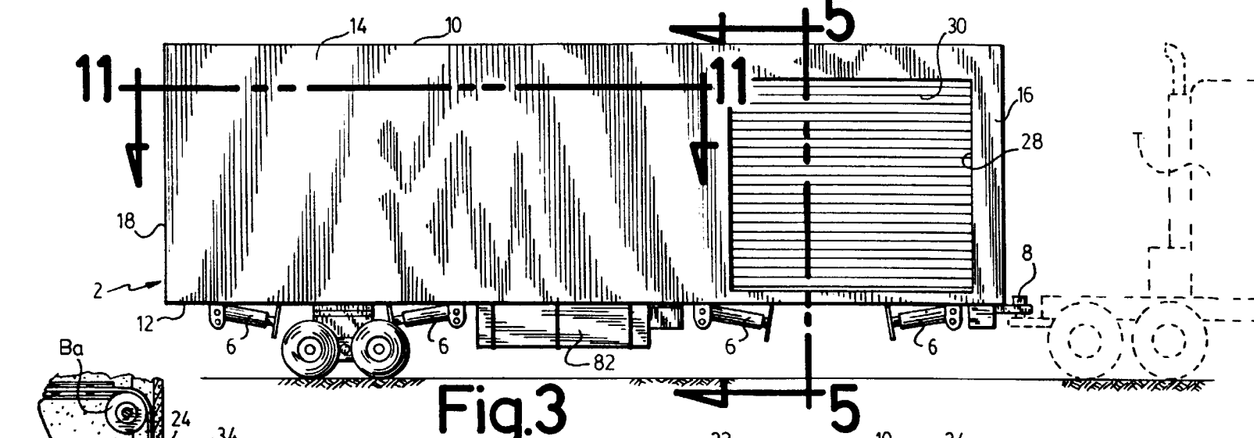
FIG. 3 is a side elevation of the semi-trailer showing the same hitched to a road tractor shown in dotted line.

The semi-trailer or lock chamber 2 is further provided with a conventional hitch 8 at the front-end thereof for hitching the semi-trailer to a road tractor T. The lock chamber 2 forms an elongated compartment defined by a top wall 10, a bottom wall 12, a pair of side walls 14, a front-end wall 16 and a rear-end wall 18. This compartment has a uniform cross-sectional area between end walls 16 and 18.

Figure 4:
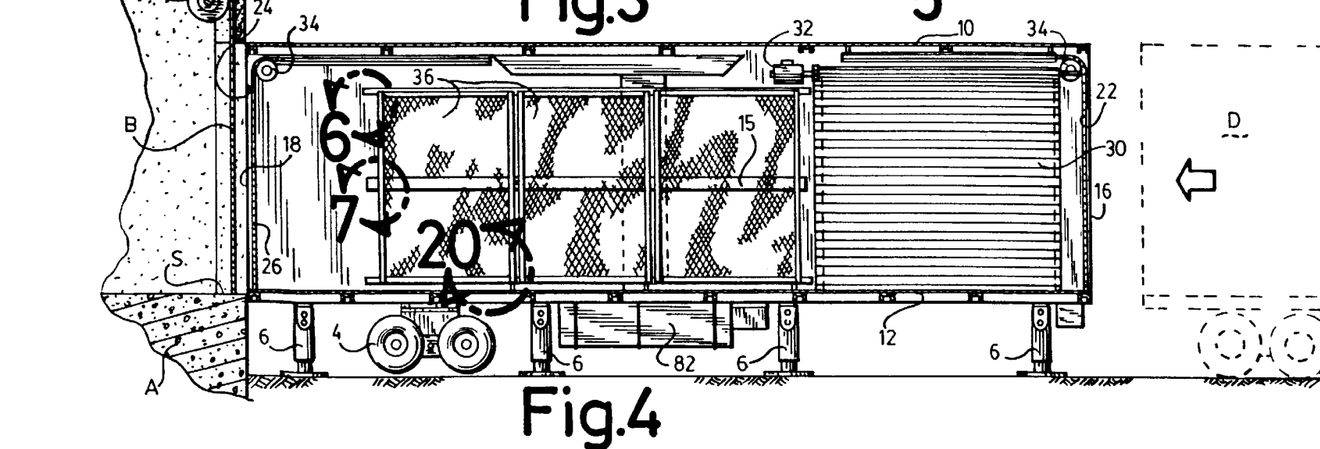
FIG. 4 is a longitudinal section of the semi-trailer in parked position at the merchandise receiving dock also shown in section.
Figure 5:
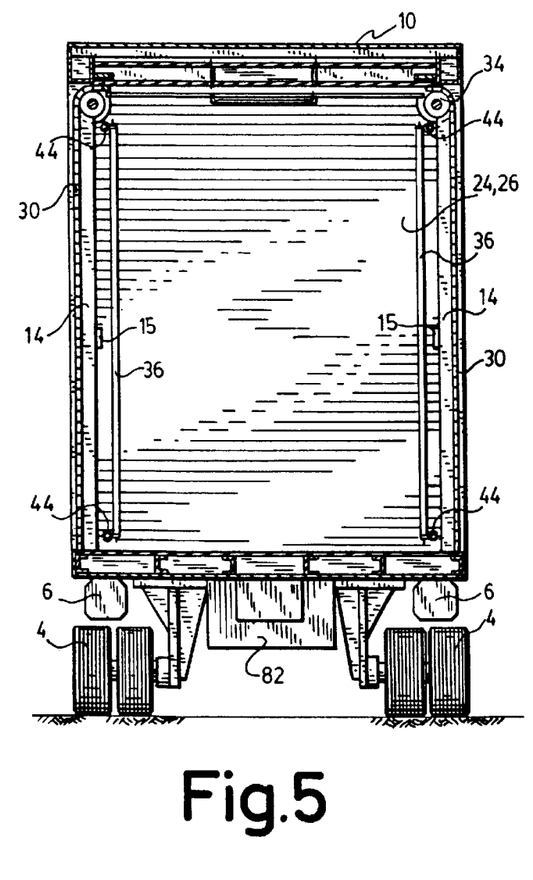
FIG. 5 is a cross-section taken along line 5—5 of FIG. 3.
Figures 6, 9:
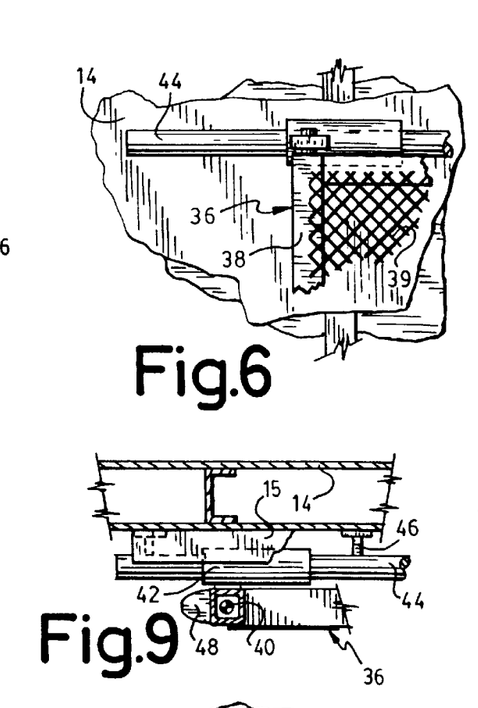
FIG. 6 is an enlarged partial view taken in area 6 of FIG. 4.
FIG. 9 is a top-plan section of the elements shown in FIG. 8 and showing the partition panel in opened position.
Figure 7:
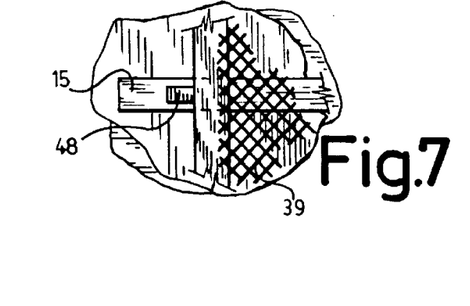
FIG. 7 is an enlarged partial view taken in area 7 of FIG. 4.
Figure 8:
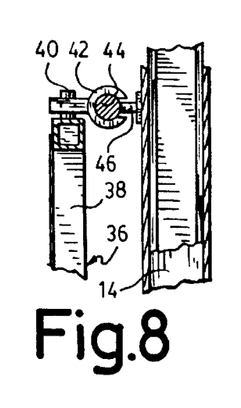
FIG. 8 is a cross-section of the elements shown in FIG. 6 and showing a partition panel in opened position.
Figure 10:
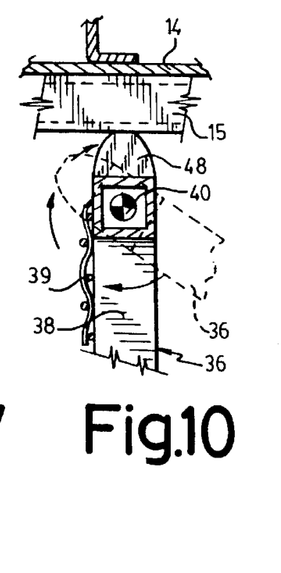
FIG. 10 is a view of the same elements as in FIG. 9 and showing the partition panel in closed position.

A front merchandise receiving opening 20 is formed in the front-end wall 16, said opening 20 capable of being completely closed by a door 22. The rear-end wall 18 is provided with the back merchandise retrieving opening 24 capable of being closed by a door 26. Preferably, additional merchandise receiving openings are provided adjacent the front merchandise receiving opening 20. These additional openings are indicated at 28 being made in the side walls 14 adjacent the front-end wall 16. Openings 20, 24 are nearly as wide as end walls 16 and 18 and extend down to bottom wall 12 as shown in FIGS. 1, 4 and 5. Each of the lateral merchandise receiving openings 28 is provided with a door 30. Doors 22, 26 and 28 are preferably overhead doors of conventional construction each operated by an electric motor 32 and guided over rollers 34.

The lock chamber 2 in the form of a semi-trailer can be towed by a road tractor T and parked in front of a door B of loading dock A so that its merchandise retrieving opening 24 will be in communication with the door opening C.

Delivery trucks D can therefore be brought in communication with either the front merchandise receiving opening 20 or anyone of the lateral merchandise receiving openings 28 depending on the available space as shown in FIG. 2 so that merchandise from the delivery truck can be transferred to the lock chamber 2 as shown by full line arrows F in FIG. 2.

The delivered merchandise can remain in theft-proof condition within the lock chamber 2 until receiving personnel is available to open door B of the loading dock A and also the merchandise retrieving opening 24 at the back of the semi-trailer so that merchandise can be transferred to the receiving building in accordance with dotted line arrow G.

Referring to FIGS. 4, 11 and 5 to 10, it is seen that lock chamber 2 formed by the semi-trailer is provided with a plurality of partitions each formed by two partition panels 36 consisting of a frame 38 across which is secured a screen 39. Each partition panel has top and bottom hinge pins 40 at its laterally outer portion which are hinged to top and bottom sleeves 42 which are longitudinally slideable on top and bottom tracks 44 secured along each side wall 14 by closely spaced track supports 46. The sleeves 42 are longitudinally split to clear the track supports.

The laterally inner portion of each partition panel is provided at its central or middle portion with a stop lug 48 adapted to come in frictional contact with a horizontally extending centre bar 15 secured to each side wall 14. Stop lugs 48 clear the centre bars 15 when the partition panels 36 are pivoted to their opened position extending along the side walls 14.

The lower end portion of each laterally inner part of each partition panel 36 is fitted with a roller 49 in rolling engagement with the bottom wall 12.

The laterally inner portion of each partition panel 36 is provided at middle height of the panels with a locking system which comprises a panel locking lever 50 engageable with a lever retainer 52 which carries a spring-loaded plunger 54. The lever retainer 52 is secured to a plate 53 secured to one of the partition panels 36; the spring loaded plunger 54 is engageable with a hole 51 made in the panel locking lever 50. The latter is secured at its inner end to a lever pivot pin 56 which extends across the other of the partition panels and within a tube 57a which is secured to opposite reinforcing plates 57 secured to the other partition panel 36 on opposite sides of the same. The other end of the pivot pin is secured to an activating arm 58 with a handle 59 at its outer end. Panel locking lever 50 is formed at its lower edge with a bevel 60 to clear the spring loaded plunger 54 when the lever 50 is pivoted to its locking position. It is clear that the activating arm 58 is on the side of the partition panels 36 looking towards the front merchandise receiving opening 20 of the lock chamber 2 while the panel locking lever 50 together with its spring loaded plunger 54 is located on the side of the partition panels looking towards the back of the trailer, that is towards the merchandise retrieving opening 24. Therefore the partition panels can be unlocked only from the receiving section or loading dock A.

Figure 21:
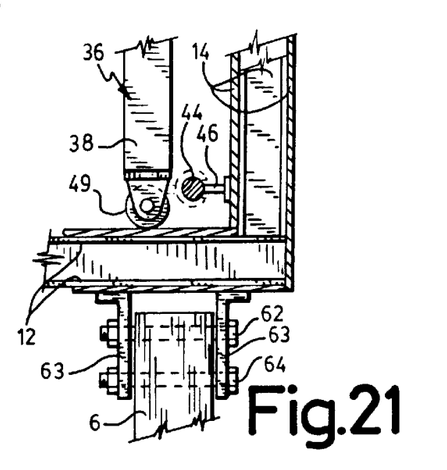
FIG. 21 is a partial cross-section taken along line 21—21 of FIG. 20 and also partially showing a trailer stabilising strut in operative position.
Figure 22:
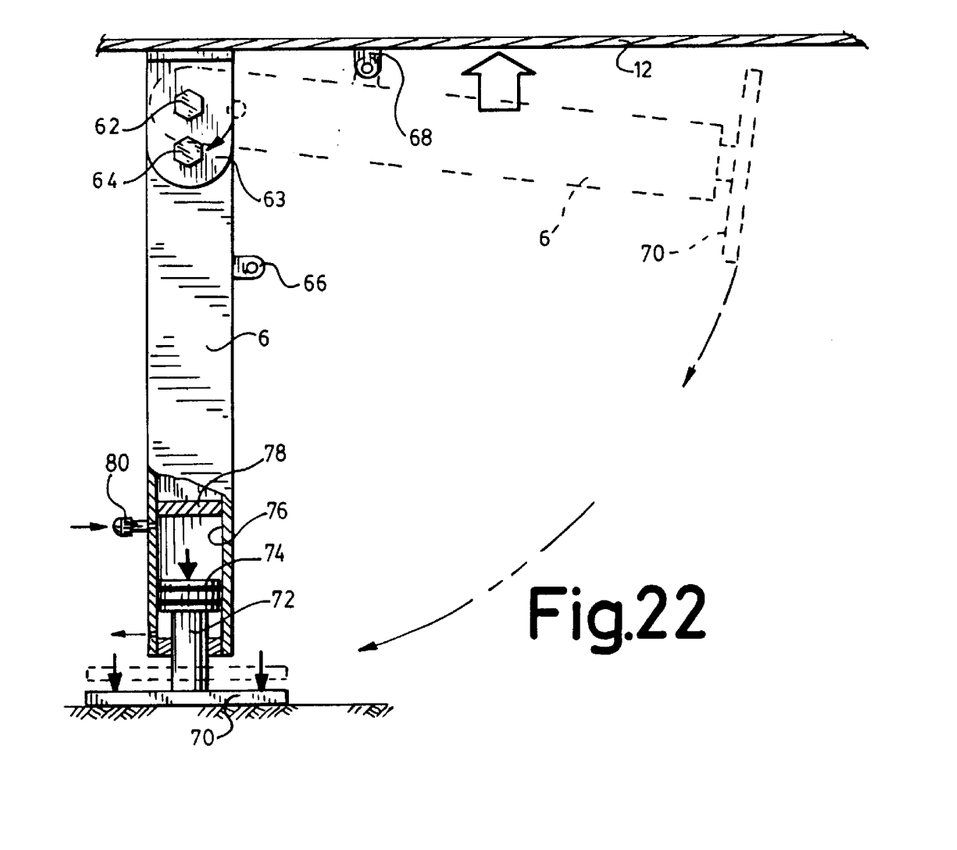
FIG. 22 is a cross-section of the trailer bottom wall and showing a trailer stabilising strut in operative position and in raised inoperative position in dotted line.

Referring to FIGS. 21 and 22, it is seen that each strut 6 is pivoted by means of a pivot bolt 62 by a bracket 63 which is secured to the underside of the bottom wall 12. Strut 6 is secured in operative up-right position by means of a locking bolt 64, but can be pivoted to a raised, inoperative position shown in dotted line in FIG. 22 and retained in this inoperative position by means of a pin (not shown) engaging registering holes made in an ear 66 fixed to the strut and an ear 68 fixed to the bottom wall 12. Strut 6 is provided with a ground engaging pad 70 secured to the end of a piston rod 72, the piston 74 of which is located within a cylinder 76 defined by the inside of the strut and by a cylinder end wall 78. The cylinder is provided a fluid filling valve 80.

As shown in FIG. 3, in the elevated position of the struts, the semi-trailer can be moved over a road by the tractor T and in their operative up-right position as is shown in FIG. 4, the struts can be adjusted so as to raise the lock chamber to a level with the wheels 4 off the ground and with the bottom wall 12 at the level of the sill S of the selected door opening C of the loading dock A.

Figure 23:
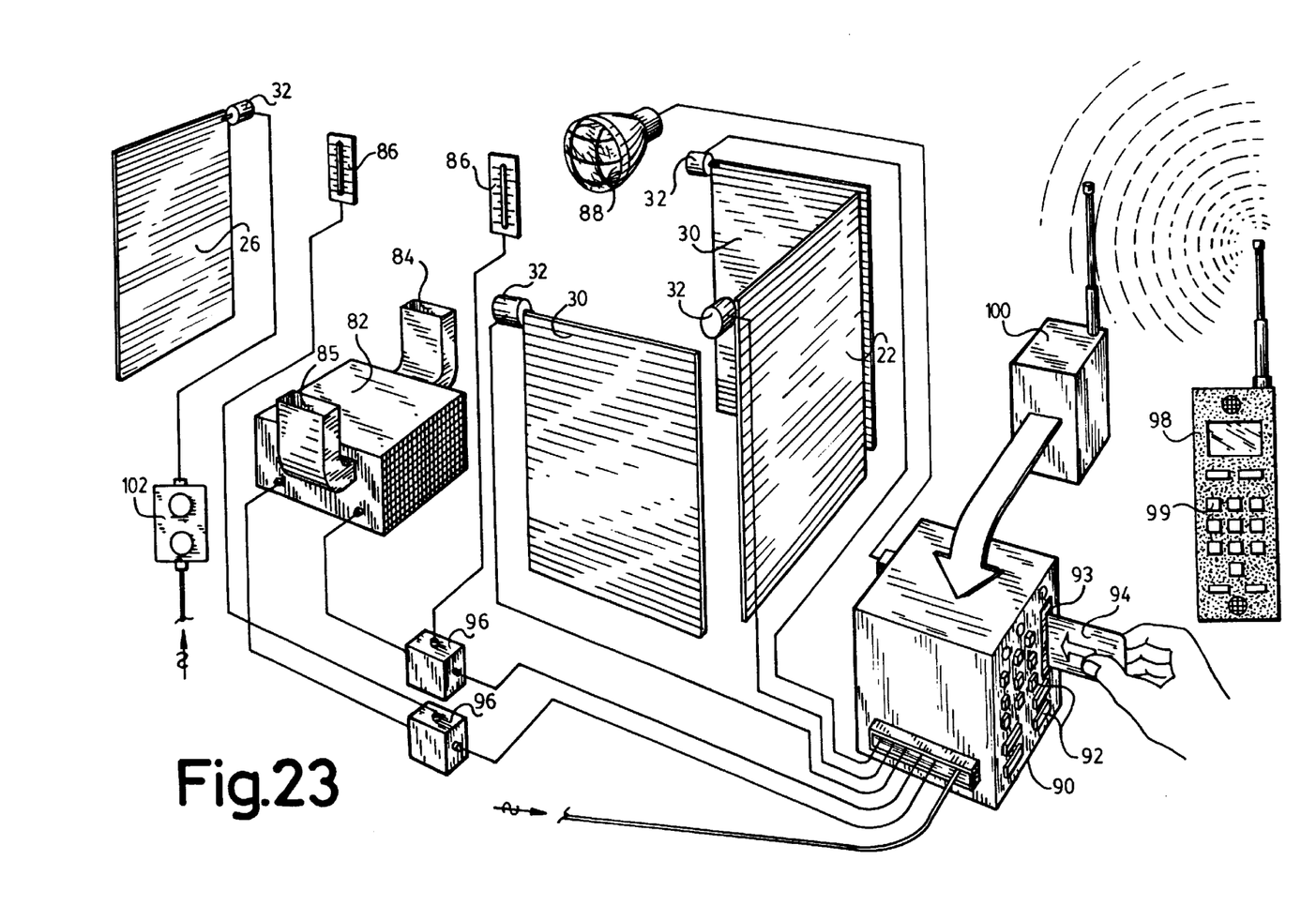
FIG. 23 is an exploded, perspective, schematic view of the different elements of the semi-trailer operated by an electronic control system including means to lock the doors and operate the refrigerating system.

Referring to FIGS. 3, 5 and 23, lock chamber 2 is provided with a refrigerating unit indicated at 82 suspended from the bottom wall 12 and having a cool air feeding duct 84 and air return duct 85. These ducts may have branches for cooling selected longitudinally spaced areas of the lock chamber, each branch being controlled by a suitable damper (not shown). The cooled areas are provided with temperature sensors 86. The inside of the lock chamber is illuminated by lamps 88.

In accordance with the invention, an electronic control system 90 is carried by the semi-trailer. Its control buttons 92 and card receiving slot 93 are accessible from the exterior of the lock chamber. Therefore, a magnetic card 94 can be inserted into slot 93 and a personal identification code number entered into the system 90 through the buttons 92.

In this manner, an authorised person can activate the motors 32 at the merchandise receiving openings 20, 28 and start operation of the refrigerating unit 82. The temperature sensors 86 serve to operate the refrigerating unit so as to maintain the temperature within the compartment of the lock chamber at a set temperature or to maintain individual temperatures in the sub-compartments defined by the partition panels 36 provided the latter are heat insulated instead of having screens 39.

Junction boxes 96 are provided in the circuits between the control system 90, the temperature sensors 86 and the refrigerating unit 82.

The control system 90 can also be operated by a remote control radio emitter 98 and a radio receiver 100 connected to the control system 90. Remote control 98 is provided with buttons 99 corresponding to the buttons 92 on the control system 90 and can operate the latter without having to use a magnetic card.

The over-hang door 26 of the back merchandise retrieving opening 24 is operated by a push button switch 102 which is disposed inside the loading dock A.

The lock chamber, in accordance with the invention, operates in the following manner. The driver of a delivery truck D who carries the remote control 98, when approaching lock chamber 2, operates the remote control 98 by pushing the control buttons 99 so as to enter his personal identification number which is transmitted through radio receiver 100 the control unit 90 and so as to open one or the other of the doors 22 or 30 and have access to the compartment defined by the lock chamber 2.

The same operation can be effected by accessing unit 90 and using magnetic card 94 and buttons 92.

The first delivery of merchandise is transferred to the sub-compartment next to the back of the lock chamber. After completion of the first delivery, the partition panels 36 nearest to the back wall 18 of the lock chamber are longitudinally moved along tracks 44 while in their opened position to come close to the load of merchandise just delivered and then they are closed whereby the stop lugs 48 carried by the partition panels engage the centre bars 15 and lock the closed panels in longitudinally adjusted position, then the closed partition panels 36 are locked from the outside of the loaded sub-compartment by rotating activating arm 58 so that the spring-loaded plunger 54 engages hole 51 in panel locking lever 50.

Successive delivery trucks then can deliver successive loads in the adjustable volume sub-compartments of the lock chamber.

Figures 11, 12, 13:
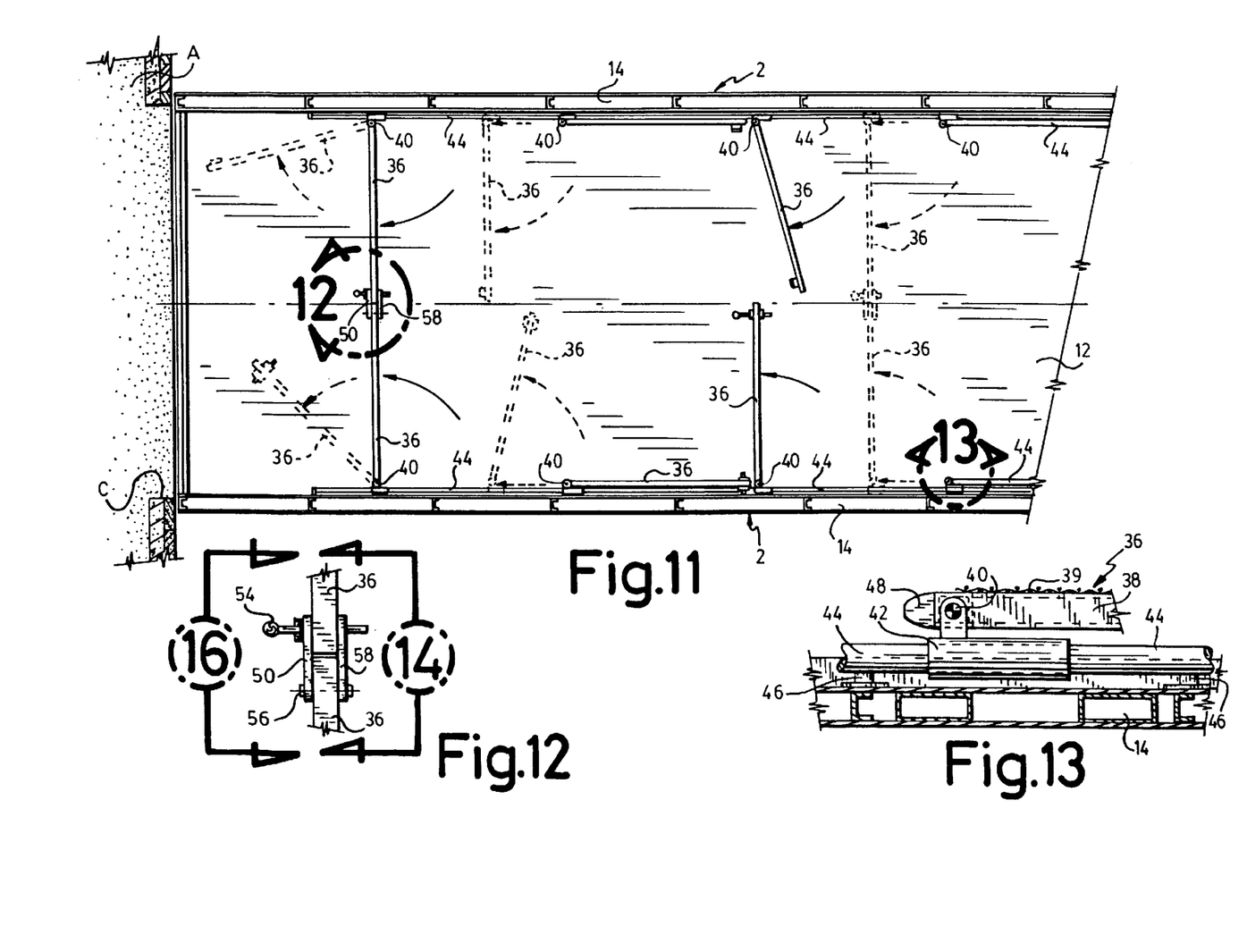
FIG. 11 is a plan section taken along line 11—11 of FIG. 3.
FIG. 12 is a top plan view taken in area 12 of FIG. 11.
FIG. 13 is a partial plan section and top-plan view taken in area 13 of FIG. 11.
Figure 14:
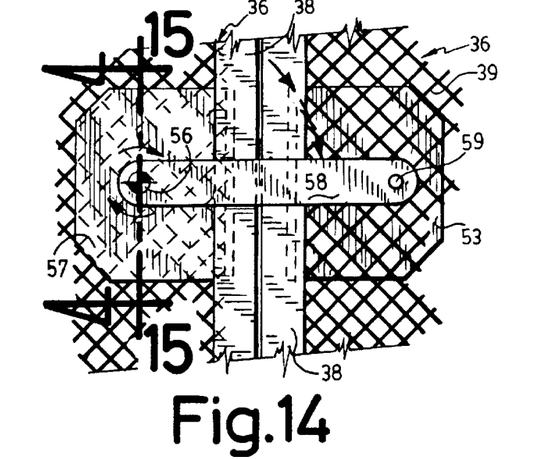
FIG. 14 is a partial elevation taken in area 14 of FIG. 12.
Figure 15:
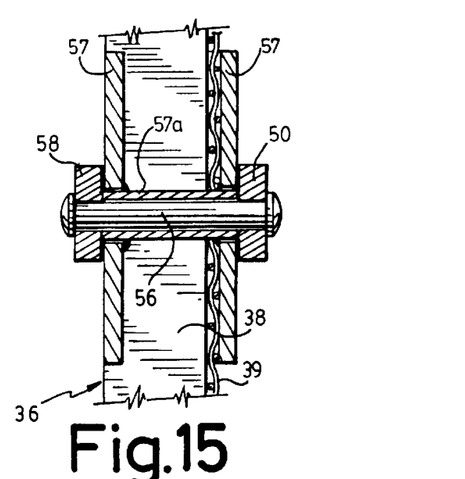
FIG. 15 is a partial section taken along line 15—15 of FIG. 14.
Figure 16:
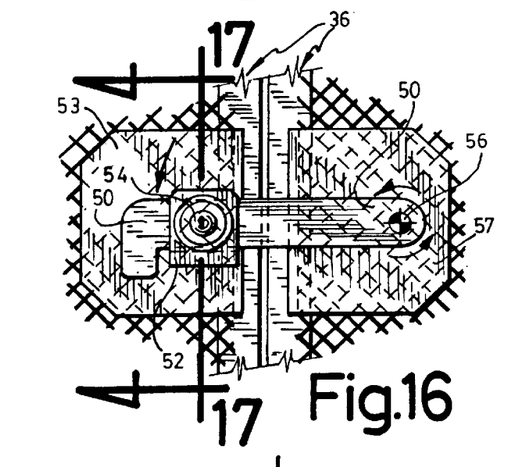
FIG. 16 is a partial elevation taken in area 16 of FIG. 12.
Figure 17:
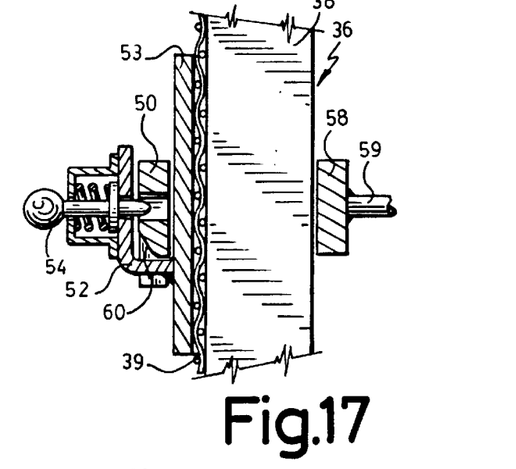
FIG. 17 is a partial section taken along line 17—17 of FIG. 16.
Figure 18:
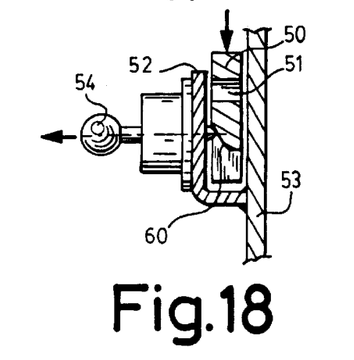
FIG. 18 is a partial view similar to that of FIG. 17 and showing another position of the locking lever and spring loaded plunger.
Figure 19:
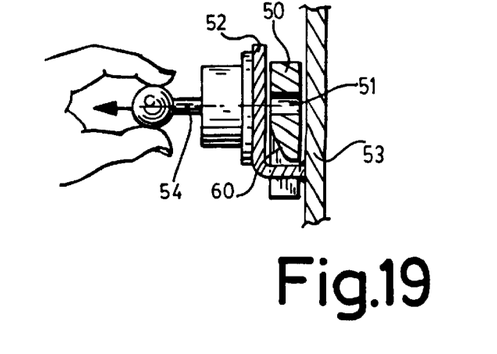
FIG. 19 is a view similar to that of FIG. 18 showing how the spring loaded plunger is retracted to allow opening of the locking lever.
Figure 20:
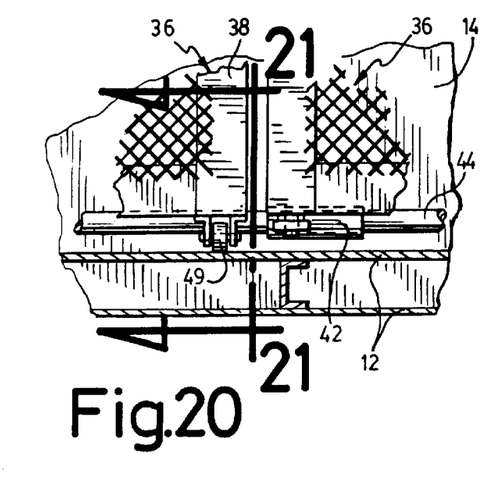
FIG. 20 is a partial cross-section of the bottom wall of the semi-trailer and a partial elevation of two adjacent partition panels in opened position.

Whenever personnel is available at the loading dock, the over-hang door B which rides on rollers Ba is opened and push button switch 102 is operated from the inside of the loading dock A to open the door 26 of the merchandise retrieving opening 24 to have access to the nearest sub-compartment defined between said door and the nearest partition panels 36. Once the first sub-compartment is unloaded, access to the next sub-compartment is obtained by pulling on the spring loaded plunger 54 to permit opening of the panel locking lever 50 whereby the partition panels 36 can be opened in a direction towards the back of the trailer as shown in FIG. 11 to gain access to the following sub-compartment. The unloading operation is repeated for each of the loaded sub-compartments.

Lock chamber 2 of the present invention could be made inside the building receiving section A instead of being incorporated in a semi-trailer as shown.

I claim:

1. A lock chamber comprising a storage structure for receiving merchandise having walls defining a storage compartment therein, said walls including top and bottom walls, a pair of opposed side walls and a pair of opposite first and second end walls, said first end wall defining a merchandise receiving opening and said second end wall defining a merchandise retrieving opening and said openings being nearly as wide as said end walls, a lockable door for closing each opening, both said openings extending down to said bottom wall whereby said compartment can be loaded through said merchandise receiving opening unloaded through said merchandise retrieving opening and each door locked when said compartment contains merchandise.

2. A lock chamber as defined in claim 1, wherein said compartment is elongated and has a uniform cross-sectional area between said end walls, further including openable and closable partitions within said compartment which, when closed, are parallel to said end walls to form sub-compartments including a first sub-compartment defined by a first partition and said second end wall and partition position adjusting mechanism to adjust the individual position of said partitions relative to one another and relative to said end walls to vary the volume of said sub-compartments, whereby said first sub-compartment can be loaded with merchandise when all of said partitions are opened and further including blocking devices to block each partition in adjusted position and locks carried by said partitions and operable to unlock said Partitions only from their side facing said merchandise retrieving opening, whereby said sub-compartments can be successively loaded through said merchandise receiving opening starting from said first sub-compartment with all of said partitions in opened position and the next sub-compartment can be loaded after closing and locking of the partition defining said first sub-compartment and all of said sub-compartments can be unloaded through said merchandise retrieving opening by unlocking and opening the door of said merchandise retrieving opening and by successively unlocking and opening said partitions.

3. A lock chamber as defined in claim 1, wherein said storage structure is a wheeled trailer including retractable, stabilising, height adjustable struts and hitching means at one end wall for hitching said trailer to a road tractor.

4. A lock chamber as defined in claim 2, wherein said storage structure is a wheeled trailer including retractable, stabilising, height adjustable struts and hitching means at one end wall for hitching said trailer to a road tractor.

5. A lock chamber as defined in claim 1, further including an additional merchandise receiving opening made in at least one of said side walls adjacent said one end wall, an additional door for said additional merchandise receiving opening and locking means for said additional door.

6. A lock chamber as defined in claim 2, further including an additional merchandise receiving opening made in at least one of said side walls adjacent said one end wall, an additional door for said additional merchandise receiving opening and locking means for said additional door.

7. A lock chamber as defined in claim 6, wherein said storage structure is a wheeled trailer including retractable, stabilising, height adjustable struts and hitching means at one end wall for hitching said trailer to a road tractor.

8. A lock chamber as defined in claim 2, wherein each door is an overhead door and further including a door operating electric motor for each door.

9. A lock chamber as defined in claim 7, wherein each door is an overhead door and further including a door operating electric motor for a each door.

10. A lock chamber as defined in claim 2, wherein each of said partitions include a pair of panels each having a laterally outer portion and a laterally inner portion, and said partition position adjusting mechanism includes a pair of top and bottom parallel tracks extending along and close to each side wall and normal to said end walls, top and bottom sleeve members longitudinally displaceable on and guided by said tracks, and said laterally outer portions of each panel pivoted to said top and bottom sleeve members for movement between an opened position extending along a related side wall and a closed position extending across said compartment and in which said laterally inner portion of said pair of panels meet together, said locks carried by said laterally inner portions of said pair of panels and said blocking devices carried by said laterally outer portions of said pair of panels for blocking the latter in adjusted position.

11. A lock chamber as defined in claim 10, wherein said storage structure is a wheeled trailer including retractable, stabilising, height adjustable struts and hitching means at one end wall for hitching said trailer to a road tractor.

12. A lock chamber as defined in claim 11, further including an additional merchandise receiving opening made in at least one of said side walls adjacent said one end wall, an additional door for said additional merchandise receiving opening and locking means for said additional door.

13. A lock chamber as defined in claim 10, wherein said blocking devices include stop lugs carried by said panel and coming in blocking contact with said side walls in the closed position of said panels.

14. A lock chamber as defined in claim 10, wherein said locks include a lever pivoted to the laterally inner portion of one panel, a lever retainer fixed to the laterally inner portion of the other panel, both said lever and said lever retainer located at the face of said panels looking towards said merchandise retrieving opening, a spring-loaded plunger carried by said lever retainer and biased towards entrance into a registering hole of said lever to lock said lever within said lever retainer and a lever operating arm secured to said lever and located at the opposite face of said panels to pivot said lever towards its locked position.

15. A lock chamber as defined in claim 10, further including track supports fixed to said side walls and to said tracks at short intervals, said sleeve members being longitudinally split to clear said supports.

16. A lock chamber as defined in claim 13, wherein said locks include a lever pivoted to the laterally inner portion of one panel, a lever retainer fixed to the laterally inner portion of the other panel, both said lever and said lever retainer located at the face of said panels looking towards said merchandise retrieving opening, a spring-loaded plunger carried by said lever retainer and biased towards entrance into a registering hole of said lever to lock said lever within said lever retainer and a lever operating arm secured to said lever and located at the opposite face of said panels to pivot said lever towards its locked position and further including track supports fixed to said side walls and to said tracks at short intervals said sleeve members being longitudinally split to clear said supports.

17. A lock chamber as defined in claim 16, wherein each door is an overhead door and further including a door operating electric motor for each door, said locks including an electronic circuit system normally stopping operation of the motor operating the door for said merchandise receiving opening and causing said operation when activated by recognition of a personal identification code number.

18. A lock chamber as defined in claim 17, which is provided with refrigerating means for refrigerating said storage compartment, said electronic circuit system also serving to operate said refrigerating means when activated by recognition of a personal identification code number.

* * * * *